US009139683B2

(12) United States Patent
Lindner et al.

(10) Patent No.: US 9,139,683 B2
(45) Date of Patent: Sep. 22, 2015

(54) PROCESS FOR PRODUCING A POLYURETHANE FOAM BY MEANS OF SUPERCRITICAL OR NEAR-CRITICAL BLOWING AGENT

(75) Inventors: Stefan Lindner, Köln (DE); Wolfgang Friederichs, Köln (DE); Reinhard Strey, Dormagen (DE); Thomas Sottmann, Köln (DE); Elena Khazova, Mannheim (DE); Lorenz Kramer, Köln (DE); Verena Dahl, Köln (DE); Agnes Chalbi, Hürth (DE)

(73) Assignee: Bayer MaterialScience AG, Leverkusen (DE)

( * ) Notice: Subject to any disclaimer, the term of this patent is extended or adjusted under 35 U.S.C. 154(b) by 572 days.

(21) Appl. No.: 13/505,769

(22) PCT Filed: Nov. 3, 2010

(86) PCT No.: PCT/EP2010/066744
§ 371 (c)(1),
(2), (4) Date: Jun. 13, 2012

(87) PCT Pub. No.: WO2011/054873
PCT Pub. Date: May 12, 2011

(65) Prior Publication Data
US 2012/0245243 A1 Sep. 27, 2012

(30) Foreign Application Priority Data
Nov. 6, 2009 (DE) .......................... 10 2009 053 218

(51) Int. Cl.
C08G 18/08 (2006.01)
B29C 44/34 (2006.01)
C08G 18/66 (2006.01)
C08J 9/12 (2006.01)
C08J 9/14 (2006.01)
C08G 101/00 (2006.01)

(52) U.S. Cl.
CPC .............. *C08G 18/14* (2013.01); *B29C 44/348* (2013.01); *C08G 18/6644* (2013.01); *C08J 9/122* (2013.01); *C08J 9/141* (2013.01); *C08G 2101/005* (2013.01); *C08G 2101/0025* (2013.01); *C08J 2203/08* (2013.01); *C08J 2375/04* (2013.01)

(58) Field of Classification Search
CPC .... B29C 44/348; C08G 18/14; C08J 2203/08
USPC ....................................................... 521/130
See application file for complete search history.

(56) References Cited

U.S. PATENT DOCUMENTS

| 6,417,241 | B1 * | 7/2002 | Huygens et al. ............... 521/137 |
| 6,821,476 | B2 * | 11/2004 | McClelland et al. ......... 264/572 |
| 2003/0144368 | A1 | 7/2003 | Sulzbach et al. |
| 2004/0054022 | A1 | 3/2004 | Ohnuma et al. |
| 2005/0131090 | A1 | 6/2005 | Furlan et al. |
| 2006/0127663 | A1 | 6/2006 | Strey et al. |
| 2008/0114088 | A1 * | 5/2008 | Sasaki et al. ................... 521/174 |
| 2008/0188577 | A1 | 8/2008 | Schmidt et al. |
| 2009/0062414 | A1 * | 3/2009 | Huang et al. ................... 521/159 |
| 2009/0099273 | A1 * | 4/2009 | Williams et al. ................ 521/94 |

FOREIGN PATENT DOCUMENTS

| DE | 10260815 A1 | 7/2004 |
| EP | 0142866 A2 | 5/1985 |
| EP | 0353061 A2 | 1/1990 |
| EP | 1401912 | 3/2004 |
| GB | 2365013 A | 2/2002 |
| JP | 2005161589 A | 6/2005 |
| JP | 2009249513 A | 10/2009 |
| RU | 97115776 A | 7/1999 |
| RU | 2312112 C2 | 6/2005 |
| RU | 2007112444 A | 10/2008 |
| WO | WO-89/05336 A1 | 6/1989 |
| WO | 9723553 A1 | 7/1997 |
| WO | WO-01/98389 A1 | 12/2001 |
| WO | 03000770 A1 | 1/2003 |
| WO | WO-2006128872 A1 | 12/2006 |
| WO | WO-2007094780 A1 | 8/2007 |

OTHER PUBLICATIONS

Kahlweit, M., et al., *Phase Behavior of Ternary Systems of the Type $H_{20}$-Oil-Nonionic Amphiphile (Microemulsions)* (1985), Angew. Chem. Int. Ed. Engl. 24, pp. 654-668.
International Search Report for PCT/EP2010/066744 mailed Sep. 19, 2011.

* cited by examiner

*Primary Examiner* — Melissa Rioja
(74) *Attorney, Agent, or Firm* — Drinker Biddle & Reath LLP

(57) ABSTRACT

The present invention relates to a process for producing a polyurethane foam, where the blowing agent used is present in the supercritical or near-critical state. A reaction mixture is introduced into a closed mould, where the closed mould has been set up in such a way that its interior volume and/or the pressure prevailing in its interior can be altered after the introduction of the mixture by external influence. Through the selection of the surfactant it is possible to obtain microemulsions of the blowing agent in the polyol phase. The invention further relates to a nanocellular polyurethane foam obtainable by the process of the invention.

14 Claims, 7 Drawing Sheets

PROCESS FOR PRODUCING A POLYURETHANE FOAM BY MEANS OF SUPERCRITICAL OR NEAR-CRITICAL BLOWING AGENT

CROSS-REFERENCE TO RELATED APPLICATIONS

This application is a national stage application (under 35 U.S.C. §371) of PCT/EP2010/066744, filed Nov. 3, 2010, which claims benefit of German application 10 2009 053218.8, filed Nov. 6, 2009, both of which are incorporated herein by reference in their entirety for all their useful purposes.

BACKGROUND

The present invention relates to a process for producing a polyurethane foam, where the blowing agent used is present in the supercritical or near-critical state. The invention further relates to a nanocellular polyurethane foam obtainable by the process of the invention.

Theoretical considerations make nanocellular or nanoporous polymer foams particularly good materials for thermal insulation. The interior dimensions of these foam structures are in the region of the mean free path lengths of a gas molecule. The contribution of the gas to heat transmission can thus be reduced. Polyurethanes are a polymer group often used in thermal insulation.

When polyurethane foams are produced, a polyol component, which also comprises a blowing agent, is reacted with an isocyanate. The reaction of isocyanate with water produces carbon dioxide, which also acts as blowing agent.

The decisive step for the formation of the foam and therefore for the subsequent cell size of the hardened foam, is the nucleation provided by blowing agents, since each cell in the foam has been produced from a gas bubble. A relevant observation here is that after nucleation no new gas bubbles are generally produced, but instead blowing agent diffuses into existing gas bubbles.

Addition of stabilizers promotes the emulsification of the various components, influences nucleation, and inhibits coalescence of the expanding gas bubbles. They also influence cell opening. In open-cell foams, the membranes of the expanding pores are opened and the pore walls are retained.

One possible approach emulsifies a supercritical blowing agent in the reaction mixture and then hardens the foam after a pressure reduction. A known variant here is the POSME process (principle of supercritical micro emulsion expansion). The blowing agent in the said process takes the form of a microemulsion. Microemulsions form under particular conditions, which depend inter alia on the concentration of the emulsifiers and on the temperature. A feature of microemulsions is that they are stable and that the non-polar phase, the blowing agent in this case, can be present in the form of very small droplets within the polar phase. The diameters of these droplets can be in the range from 1 to 100 nanometers.

DE 102 60 815 A1 discloses foamed material and a production process for the foamed material. The intention is that foamed material with nano-size foam bubbles be produced without any need to surmount the energy barrier which usually arises at phase transitions and in nucleation processes. An objective associated with this is controllable production of a foamed material which has a numeric density of foam bubbles of from $10^{12}$ to $10^{18}$ per cm$^3$, and also an average diameter of foam bubbles of from 10 nm to 10 μm. It is based on the dispersion of a second fluid in the form of pools within a matrix of a first fluid. The first fluid is present in the form of matrix in a reaction space, and the second fluid is present in the form of pools. The second fluid is converted into a near-critical or supercritical state with a density close to that of a liquid, through a change in pressure and/or temperature. The second fluid is therefore entirely or almost entirely in the form of pools which have uniform distribution within the entire first fluid. Depressurization causes the second fluid to revert to a state with gaseous density, and the pools here are expanded to give nanometer-size foam bubbles. There is no need to surmount any energy barrier, and there is no requirement that the blowing agent molecules diffuse to the expanding bubbles.

A polymerizable substance is generally proposed as first fluid here. However, express mention is made only of acrylamide, which polymerizes to give polyacrylamide, and melamine, which polymerizes to give melamine resin. The second fluid should be one selected from a group of hydrocarbon substances, such as methane or ethane, or else from alkanols, fluorochlorocarbons or $CO_2$. An amphiphilic material is also used, and this should have at least one block with affinity for the first fluid, and at least one block with affinity for the second fluid.

WO 2007/094780 A1 discloses, in relation to polyurethane foams, a resin composition with a polyol, an ethoxylated/propoxylated surfactant initiated by a short-chain compound, and also a hydrocarbon as blowing agent. The ethoxylated/propoxylated surfactant increases the solubility and/or compatibility of the hydrocarbon blowing agent and improves the phase stability of the resin composition. The resin composition is suitable for the reaction with polyfunctional organic isocyanates to produce cellular polyurethane foams and cellular polyisocyanurate foams.

The surfactants are obtained through the reaction of ethylene oxide and propylene oxide with an initiator from the group of compounds having an alkylene-oxide-active hydrogen atom and a $C_1$ to $C_6$ aliphatic or alicyclic hydrocarbon group, compounds having an alkylene-oxide-active hydrogen atom and a $C_6$ to $C_{10}$ aryl or alkylaryl hydrocarbon group, or combinations thereof. The initiator is preferably selected from the group of the $C_1$ to $C_6$ aliphatic or alicyclic alcohols, phenol, $C_1$ to $C_4$ alkylphenols and combinations thereof.

Butanol-initiated propylene oxide/ethylene oxide surfactant is mentioned as an example. As an alternative, the surfactant can also comprise an alkoxylated triglyceride adduct or an ethoxylated derivative of a sorbitan ester. The blowing agent can be a $C_4$ to $C_7$ aliphatic hydrocarbon, $C_4$ to $C_7$ cycloaliphatic hydrocarbon or a combination thereof. Pentanes are mentioned as an example.

However, the examples mentioned do not disclose any polyol composition in which the selection of the surfactants leads to the presence of the blowing agent in the form of a microemulsion.

Specific siloxane surfactants are addressed inter alia in US 2005/0131090 A1. Here, a process is disclosed for producing rigid polyurethane foams through reaction of a polyisocyanate and of a polyol in the presence of a urethanization catalyst, of a blowing agent, and optionally of water and of a silicone surfactant. Blowing agents used are $C_4$- or $C_5$-hydrocarbons, or a mixture of these. The average molar mass of the blowing agents is ≤72 g/mol and their boiling point is in the range from 27.8 to 50° C. The silicone surfactant comprises a polyether-polysiloxane copolymer which is represented by the following general formula: $(CH_3)_3$—Si—O—$(Si(CH_3)_2$—O$)_x$—$(Si(CH_3)(R)O)_y$—Si$(CH_3)_3$, in which:
R=$(CH_2)_3$—O—(—$CH_2$—$CH_2$—O$)_a$—$(CH_2$—CH$(CH_3)$—O$)_b$—R" and in which R" is H, $(CH_2)_z CH_3$ or C(O)

CH$_3$. Furthermore: x+y+2 is 60-130, x/y is 5-14 and z is 0-4. The total molar mass of the surfactant, based on the above formula, is from 7000 to 30 000 g/mol. The proportion by weight of the siloxane in the surfactant is from 32 to 70% by weight, the average molar mass (BAMW, blend average molecular weight) of the polyether fraction is from 450 to 1000 g/mol, and the content of ethylene oxide, expressed in mol %, in the polyether fraction is from 70 to 100 mol %. However, the said publication does not relate to any microemulsions or blowing agents in the supercritical state. Instead, the siloxane surfactant is used as cell stabilizer.

GB 2 365 013 A discloses alkylene-oxide-modified silicone glycols for stable polyester polyol compositions. A polyester polyol composition comprises a phthalic anhydride-initiated polyester polyol, a C$_4$-C$_6$-hydrocarbon blowing agent and an alkylene-modified silicone glycol compatibilizer with an HLB value of from about 5 to about 8. The blowing agent is soluble in the polyol composition, and the risk associated with blowing agents of this type in the production of rigid polymer foam products is thus reduced. Rigid foams are provided with good dimensional stability and with improved insulation properties. An isocyanate-modified silicone glycol compatibilizer is also disclosed.

The said Patent Application states that in some instances a particular blowing agent forms a microemulsion with the polyol and with other components. However, there is no disclosure as to whether supercritical conditions prevail here for the blowing agent. Instead, the information about microemulsions relates to the test for determining the storage stability of the polyol compositions. In the said test, the polyol composition and the blowing agent are mixed in a glass jar with cap and are shaken, and are stored at room temperature for five days. If no phase separation occurs, the blowing agent is found to be soluble in the polyol composition and the composition is found to be stable in storage. However, storage in a glass jar with cap at room temperature is not likely to provide any conditions under which a C$_4$-C$_6$-hydrocarbon is present in the supercritical state.

The said Patent Application moreover mentions that, during the production of the foams, the starting materials can be introduced at a temperature of from 15° C. to 90° C., preferably from 20° C. to 35° C., into an open or closed mould. The prevailing pressure can be above atmospheric pressure. The mixing of the isocyanate with the polyol composition which comprises dissolved blowing agent can be achieved through stirring or at high pressure through injection. The temperature of the mould can be from 20° C. to 110° C., preferably from 30° C. to 60° C. and in particular from 45° C. to 50° C. Here again, there are no indications that supercritical conditions for the blowing agent prevail.

This would be desirable, in order to obtain foams with smaller cell dimensions. Novel processes for producing such foams would also be desirable.

BRIEF DESCRIPTION OF EMBODIMENTS

According to the invention, a process is therefore proposed for producing a polyurethane foam, comprising the following steps:
providing a mixture comprising:
A) a component reactive towards isocyanates;
B) a surfactant component;
C) a blowing agent component selected from the group consisting of linear, branched or cyclic C$_1$- to C$_6$-alkanes, linear, branched or cyclic C$_1$- to C$_6$-fluoroalkanes, N$_2$, O$_2$, argon and/or CO$_2$, where blowing agent component C) is present in the supercritical or near-critical state;
D) a polyisocyanate component;
introducing the mixture comprising components A), B), C), and D) into a closed mould, where the closed mould has been set up in such a way that its interior volume and/or the pressure prevailing in its interior can be altered after introducing the mixture by external influence;
providing a predetermined period of residence time of ≥0 seconds for the mixture comprising components A), B), C), and D) in the closed mould; and
enlarging the interior volume of the closed mould and/or reducing the pressure prevailing in the interior of the closed mould by external influence.

BRIEF DESCRIPTION OF THE DRAWINGS

The foregoing brief description, as well as the following detailed description, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown.
In the drawings.

DETAILED DESCRIPTION OF EMBODIMENTS

Figure 1:
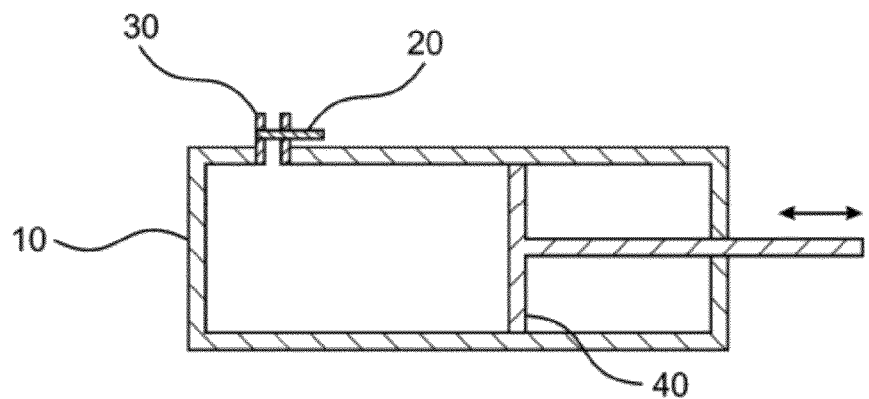
FIG. 1 illustrates a closed mould that can be used according to an embodiment of the present the invention.

The process of the invention can produce polyurethane foams with particularly small cell sizes. By way of example, foams can be produced with an average pore diameter of from ≥10 nm to ≤10 000 nm. The process uses supercritical or near-critical blowing agent. For the purposes of the present invention, near-critical conditions are present when there is compliance with the following condition: $(T_c-T)/T \leq 0.4$ and/or $(p_c-p)/p \leq 0.4$. T here means the temperature prevailing in the process, $T_c$ here means the critical temperature of the blowing agent or blowing agent mixture, p here means the pressure prevailing in the process and $p_c$ here means the critical pressure for the blowing agent or blowing agent mixture. It is preferable that near-critical conditions present comply with the following: $(T_c-T)/T \leq 0.3$ and/or $(p_c-p)/p \leq 0.3$ and it is particularly preferable that near-critical conditions present comply with the following: $(T_c-T)/T \leq 0.2$ and/or $(p_c-$ p)/p≤0.2. Without attachment to any theory, it is assumed that the selection of suitable surfactant components leads to formation of emulsions or microemulsions of the supercritical or near-critical blowing agent in the phase with components reactive towards isocyanates.

Pressures suitable for carrying out the process of the invention can by way of example be in the range from ≥40 bar to ≤300 bar. Examples of suitable temperatures are from ≥10° C. to ≤80° C. and preferably from ≥25° C. to ≤60° C. Particular preference is given to pressures and temperatures above the critical point of $CO_2$, i.e. ≥73.7 bar and ≥31° C.

It is preferable that the reaction mixture is introduced into a closed mould while maintaining the supercritical or near-critical conditions for the blowing agent. Blowing agent component C) is then present in the supercritical or near-critical state during and after the introduction process. A closed mould here in particular means a mould in which a superatmospheric pressure can be generated. In the simplest instance, the reaction mixture is introduced by way of a gas-tight inlet aperture into the mould. The closed mould prevents premature resumption of subcritical conditions for the blowing agent.

The set-up of the mould is such that its interior volume and/or the pressure prevailing in its interior can be altered after the introduction of the reaction mixture by external influence. This means that it is not only the introduction of the reaction mixture and a subsequent reaction to give a foam that alter the interior volume of, and the pressure in, the mould. Instead, the mould also has other possibilities for bringing this about externally and therefore also in a controlled manner.

The closed mould here is not a part of a mixing head of a mixing system. Instead, the closed mould is a mould which differs from this, and in which the reaction mixture introduced hardens.

A counterpressure can be generated in the mould when the reaction mixture is introduced, and the said counterpressure can be maintained as long as the mixture remains for the predetermined period in the mould. By virtue of the counterpressure, it is possible to exert influence on the expansion of the blowing agent and therefore on the cell size. The counterpressure can be above the critical pressure for the blowing agent used. The counterpressure can therefore by way of example be from ≥40 bar to ≤150 bar or from ≥70 bar to ≤120 bar. This is particularly preferable for $CO_2$ as blowing agent. It is equally possible that prevailing temperatures in the mould are above the critical temperature of the respective blowing agent. This can be achieved through external heating. However, it is also possible that these temperatures are achieved through the heat of reaction of polyurethane formation, without any other additional action. A high-pressure polyurethane system can be used to provide the components.

Once the reaction mixture has been introduced into the mould, a predetermined period of residence time of ≥0 seconds is provided for the same. It is preferable that an elevated pressure is also maintained during the residence time provided for the reaction mixture in the mould. The counterpressure can be above the critical pressure for the blowing agent used, or near-critical conditions can prevail. The counterpressure can therefore by way of example be from ≥40 bar to ≤150 bar or from ≥70 bar to ≤120 bar. This is particularly preferable for $CO_2$ as blowing agent. It is likewise possible that, during the residence time in the mould, temperatures above the critical temperature of the respective blowing agent prevail, or that near-critical conditions are present. The residence time is preferably from ≥1 second to ≤20 minutes. The residence time can also be from ≥1 minute to ≤12 minutes. During the residence time, the resultant foam crosslinks, without any expansion of gas bubbles in the foam giving an undesirable increase of cell size.

In the final step of the process of the invention, external influence causes a pressure reduction or volume increase in the closed mould. In the simplest instance, this includes the opening of the mould. It is also possible, as a function of residence time and of progress of the reaction, that a slow, controlled pressure reduction controls the cell formation in the foam.

Suitable components A) reactive towards isocyanates are in particular polyols, polyamines, polyaminoalcohols and polythiols.

Examples of polyamines are ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 1,3- and 1,4-xylylenediamine, $\alpha,\alpha,\alpha',\alpha'$-tetramethyl-1,3- and -1,4-xylylenediamine and 4,4'-diaminodicyclohexylmethane, diethylmethylbenzenediamine (DETDA), 4,4'-diamino-3,3'-dichlorodiphenylmethane (MOCA), dimethylethylenediamine, 1,4-bis(aminomethyl)cyclohexane, 4,4'-diamino-3,3'-dimethyldicyclohexylmethane and 4,4'-diamino-3,5-diethyl-3',5'-diisopropyldicyclohexylmethane. Polymeric polyamines, such as polyoxyalkyleneamines, are moreover suitable.

Examples of aminoalcohols are N-aminoethylethanolamine, ethanolamine, 3-aminopropanol, neopentanolamine and diethanolamine.

Examples of polythiols are di(2-mercaptoethyl)ether, pentaerythritol tetrakisthioglycolate, pentaerythritol tetrakis(3-mercaptopropionate) and 1,2-bis((2-mercaptoethyl)thio)-3-mercaptopropane.

The number-average molar mass $M_n$ of the polyols that can be used according to the invention can by way of example be from ≥62 g/mol to ≤8000 g/mol, preferably from ≥90 g/mol to ≤5000 g/mol and more preferably from ≥92 g/mol to ≤1000 g/mol. If a single polyol is added, the OH number of component A) is the OH number of the said polyol. In the case of mixtures, the average OH number is stated. This value can be determined by reference to DIN 53240. The average OH functionality of the polyols mentioned is by way of example ≥2, for example in the range from ≥2 to ≤6, preferably from ≥2.1 to ≤4 and more preferably from ≥2.2 to ≤3.

Examples of polyether polyols that can be used according to the invention are the polytetramethylene glycol polyethers that are obtainable through polymerization of tetrahydrofuran by means of cationic ring opening.

Polyether polyols likewise suitable are adducts of styrene oxide, ethylene oxide, propylene oxide, butylene oxides and/or epichlorohydrin onto di- or polyfunctional starter molecules.

Examples of suitable starter molecules are water, ethylene glycol, diethylene glycol, butyldiglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol, and also low-molecular-weight hydroxylated esters of polyols of this type with dicarboxylic acids.

Polyester polyols that can be used according to the invention are inter alia polycondensates of di- and also tri- and tetraols and di- and also tri- and tetracarboxylic acids, or of hydroxycarboxylic acids or of lactones. Instead of the free polycarboxylic acids it is also possible to use the corresponding polycarboxylic anhydrides, or corresponding polycarboxylic esters of lower alcohols, to produce the polyesters.

Examples of suitable diols are ethylene glycol, butylene glycol, diethylene glycol, triethylene glycol, polyalkylene glycols, such as polyethylene glycol, and also 1,2-propanediol, 1,3-propanediol, 1,3-butanediol, 1,4-butanediol, 1,6-hexanediol, and isomers, neopentyl glycol or neopentyl glycol hydroxypivalate. Other polyols that can be used, alongside these, are those such as trimethylolpropane, glycerol, erythritol, pentaerythritol, trimethylolbenzene or trishydroxyethyl isocyanurate.

Examples of polycarboxylic acids that can be used are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. It is also possible to use the corresponding anhydrides as acid source.

To the extent that the average functionality of the polyol to be esterified is ≥2, it is also possible to make additional concomitant use of monocarboxylic acids, such as benzoic acid and hexanecarboxylic acid.

Examples of hydroxycarboxylic acids which can be used concomitantly as reactants during the production of a polyester polyol having terminal hydroxyl groups are hydroxycaproic acid, hydroxybutyric acid, hydroxydecanoic acid, hydroxystearic acid and the like. Suitable lactones are inter alia caprolactone, butyrolactone and homologues.

Polycarbonate polyols that can be used according to the invention are hydroxylated polycarbonates, for example polycarbonatediols. These are obtainable through reaction of carbonic acid derivatives, such as diphenyl carbonate, dimethyl carbonate or phosgene, with polyols, preferably diols, or through the copolymerization of alkylene oxides, e.g. propylene oxide, with $CO_2$.

Examples of diols of this type are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A and lactone-modified diols of the abovementioned type.

Instead of or in addition to pure polycarbonatediols, it is also possible to use polyether polycarbonatediols.

Polyetherester polyols that can be used according to the invention are compounds which comprise ether groups, ester groups and OH groups. Suitable compounds for producing the polyetherester polyols are organic dicarboxylic acids having up to 12 carbon atoms, preferably aliphatic dicarboxylic acids having from ≥4 to ≤6 carbon atoms, or aromatic dicarboxylic acids, where these are used individually or in a mixture. Examples that may be mentioned are suberic acid, azelaic acid, decanedicarboxylic acid, maleic acid, malonic acid, phthalic acid, pimelic acid and sebacic acid, and also in particular glutaric acid, fumaric acid, succinic acid, adipic acid, phthalic acid, terephthalic acid and isoterephthalic acid. Examples of derivatives of the said acids that can be used are their anhydrides, and also their esters and hemiesters with low-molecular-weight, monohydric alcohols having from ≥1 to ≤4 carbon atoms.

Another component used for producing the polyetherester polyols are polyether polyols, where these are obtained through alkoxylation of starter molecules, such as polyhydric alcohols. The starter molecules are at least difunctional, but can also optionally comprise content of starter molecules which have higher functionality, in particular being trifunctional.

Examples of starter molecules are diols having primary OH groups and number-average molar masses $M_n$ which are preferably from ≥18 g/mol to ≤400 g/mol or from ≥62 g/mol to ≤200 g/mol, for example 1,2-ethanediol, 1,3-propanediol, 1,2-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, etherdiols, such as diethylene glycol, triethylene glycol, tetraethylene glycol, dibutylene glycol, tributylene glycol, tetrabutylene glycol, dihexylene glycol, trihexylene glycol, tetrahexylene glycol, and oligomer mixtures of alkylene glycols, such as diethylene glycol.

Polyols having number-average functionalities of from >2 to ≤8, or from ≥3 to ≤4, can also be used concomitantly alongside the diols, examples being 1,1,1-trimethylolpropane, triethanolamine, glycerol, sorbitan and pentaerythritol, and also polyethylene oxide polyols with average molar masses which are preferably from ≥62 g/mol to ≤400 g/mol or from ≥92 g/mol to ≤200 g/mol, where these use triols or tetraols as starters.

Polyetherester polyols can also be produced through the alkoxylation of reaction products obtained through the reaction of organic dicarboxylic acids with diols. Examples of derivatives of the said acids that can be used are their anhydrides, an example being phthalic anhydride.

Polyacrylate polyols can be obtained through free-radical polymerization of hydroxylated olefinically unsaturated monomers or through free-radical copolymerization of hydroxylated olefinically unsaturated monomers with, optionally, other olefinically unsaturated monomers. Examples here are ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Particularly suitable hydroxylated olefinically unsaturated monomers are 2-hydroxyethyl acrylate, 2-hydroxyethyl methacrylate, the hydroxypropyl acrylate isomer mixture obtainable through an addition reaction of propylene oxide with acrylic acid, and also the hydroxypropyl methacrylate isomer mixture obtainable through an addition reaction of propylene oxide with methacrylic acid. Terminal hydroxy groups can also be present in protected form. Suitable free-radical initiators are those from the group of the azo compounds, e.g. azoisobutyronitrile (AIBN), or from the group of the peroxides, e.g. di-tert-butyl peroxide.

Surfactants suitable for the process of the invention are not subject to any immediate restrictions with respect to their selection. The surfactants advantageously permit the blowing agent to form emulsions or microemulsions in the phase reactive towards isocyanates. Examples of surfactants are alkoxylated alkanols, for example ethers of linear or branched alkanols having from ≥6 to ≤30 carbon atoms with polyalkylene glycols having from ≥5 to ≤100 alkylene oxide units, alkoxylated alkylphenols, alkoxylated fatty acids, fatty acid esters, polyalkyleneamines, alkyl sulphates, phosphatidylinositols, fluorinated surfactants, surfactants comprising polysiloxane groups and/or bis(2-ethyl-1-hexyl)sulphosuccinate. Fluorinated surfactants can be perfluorinated or partially fluorinated surfactants. Examples here are partially fluorinated ethoxylated alkanols or carboxylic acids.

Surfactant component B) preferably comprises a siloxane-terminated polyalkylene oxide polyether. The structure of these surfactants can be linear or branched. This type of surfactant to be used according to the invention can by way of example be obtained through the hydrosilylation of an unsaturated compound with a polysiloxane bearing Si—H groups. The unsaturated compound can inter alia be the reaction product of allyl alcohol with ethylene oxide or propylene oxide.

The surfactant can also by way of example be obtained through the reaction of polyether alcohols with a polysiloxane bearing Si—Cl groups. All of the end groups in the polyether can be siloxane-terminated groups. It is also possible that mixed end groups are present, i.e. that siloxane end groups and OH end groups or reaction-functionalized OH end groups, such as methoxy groups, are present. The siloxane termination can be a monosiloxane group $R_3Si$—O— or an oligo- or polysiloxane group $R_3Si$—O—$[R_2Si$—O$]_n$-[AO], where by way of example n is from ≥1 to ≤100. In the case of branched surfactants, the siloxane termination can also have a structure $R_3Si$—O—$RSi$[AO]-O—$[R_2Si$—O$]_m$—O—$SiR_3$, where by way of example m is from ≥0 to ≤10, or can have a comb polymer structure $R_3Si$—O—$[RSi$[AO]$]_n$—O—$[R_2Si$—O$]_m$—O—$SiR_3$, where m+n is from ≥0 to ≤250. In the instances mentioned it is preferable that the moiety R is an alkyl group, in particular a methyl group. The group [AO] is a polyalkylene oxide moiety, preferably polyethylene oxide and/or polypropylene oxide. The group [AO] can also have linkage to the siloxane by way of a connecting group, such as $C_3H_6$.

The blowing agents C) that can be used according to the invention are present in the supercritical or near-critical state, i.e. above the critical temperature and above the critical pressure. The blowing agent can form a separate phase in the reaction mixture. By way of example, supercritical carbon dioxide can be used. It is possible that the carbon dioxide is formed during the reaction to give the polyurethane foam, for example through the reaction of isocyanates with water or with acids. Examples of other blowing agents are linear $C_1$-$C_5$-alkanes, branched $C_4$-$C_6$-alkanes and cyclic $C_3$-$C_6$-alkanes. Specific examples of blowing agents are methane, ethane, propane, n-butane, isobutane, n-pentane, cyclopentane, n-hexane, isohexane, 2,3-dimethylhexane and/or cyclohexane. Other examples are the partially fluorinated or perfluorinated derivatives of methane, ethane, propane, n-butane, isobutane, n-pentane, cyclopentane, n-hexane, isohexane, 2,3-dimethylbutane and/or cyclohexane.

The proportion of the blowing agent in the reaction mixture comprising components A), B) and C), but without D), can by way of example be from ≥5% by weight to ≤60% by weight. The proportion of the blowing agent in the reaction mixture comprising components A), B), C) and D) can by way of example be from ≥3% by weight to ≤60% by weight, preferably from ≥4% by weight to ≤40% by weight and particularly preferably from ≥5% by weight to ≤30% by weight.

Component D) is a polyisocyanate, i.e. an isocyanate with an NCO functionality of ≥2. The reaction mixture then present can therefore react to give polyurethane foams or else to give polyisocyanurate foams. The said reaction mixture can be produced directly in a mixing head.

Examples of these suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures of these where isomer content is as desired, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologues (polymeric MDI), 1,3- and/or 1,4-bis(2-isocyanatoprop-2-yl)benzene (TMXDI), 1,3-bis(isocyanatomethyl)benzene (XDI), and also alkyl 2,6-diisocyanatohexanoates (lysine diisocyanates) having $C_1$ to $C_6$-alkyl groups. Preference is given here to an isocyanate from the diphenylmethane diisocyanate group.

It is also possible to make concomitant use of proportions of the following, alongside the abovementioned polyisocyanates: diisocyanates modified with uretdione structure, isocyanurate structure, urethane structure, carbodiimide structure, uretonimine structure, allophanate structure, biuret structure, amide structure, iminooxadiazinedione structure and/or oxadiazinetrione structure, or else unmodified polyisocyanate having more than 2 NCO groups per molecule, for example 4-isocyanatomethyloctane 1,8-diisocyanate (nonane triisocyanate) or triphenylmethane 4,4',4''-triisocyanate.

It is possible that the isocyanate is a prepolymer which is obtainable through reaction of an isocyanate with an NCO functionality of ≥2 with polyols with a molar mass of from ≥62 g/mol to ≤8000 g/mol and with OH functionalities of from ≥1.5 to ≤6.

It is also possible, of course, to use other conventional auxiliaries and additives in the production of the polyurethane foam, for example catalysts, flame retardants, release agents, fillers and the like.

The ratio between the number of the NCO groups in polyisocyanate component D) and the number of the groups in component A) that are reactive towards isocyanates can by way of example be from ≥50:100 to ≤500:100. The said index can also be in the range from ≥160:100 to ≤330:100 or else from ≥80:100 to ≤140:100.

In one embodiment of the process of the invention, blowing agent component C) is present in the supercritical or near-critical state during the residence time of the mixture comprising components A), B), C) and D). Furthermore, after the enlargement of the interior volume of the closed mould and/or reduction of the pressure prevailing in the interior of the closed mould, blowing agent component C) is no longer present in the supercritical state. The said procedure is advantageous when the intention is to achieve the controlled expansion of a microemulsion of the supercritical blowing agent.

In another embodiment of the process of the invention, the pressure prevailing after the mixing of components A), B), C), and D) is from ≥40 bar to ≤150 bar. This state can in particular prevail in a mixing head and after a mixing head. The pressure can also be from ≥80 bar to ≤120 bar. At pressures of this type it is possible to maintain supercritical conditions for the blowing agent used.

In one embodiment of the process of the invention, component A) comprises a polyester polyol with a hydroxy number from ≥200 mg KOH/g to ≤600 mg KOH/g and a short-chain polyol with a hydroxy number of ≥800 mg KOH/g. A suitable polyester polyol is obtainable inter alia with the trademark Desmophen® VP.PU 1431 from Bayer MaterialScience AG. The OH number of the polyester polyol can also be from ≥290 mg KOH/g to ≤320 mg KOH/g. Short-chain polyols are in particular polyols having from ≥2 to ≤6 carbon atoms. Glycerol is preferred. Its OH number is 1827 mg KOH/g. Addition of the short-chain polyol can advantageously increase the polarity of the polyol phase.

In another embodiment of the process of the invention, surfactant component B) comprises a polyethylene oxide polyether having oligodimethylsiloxane end groups, where the number of the dimethylsiloxane units is ≤5. This type of polyether can by way of example be represented by the idealized formula R'O—$[CH_2CH_2O]_o$—X—$SiR(O$—$SiR_3)$ $((O$—$SiR_2)_pR)$, where R=$CH_3$ and R'=H, $CH_3$ or $COCH_3$.

X here can be an optional connecting group, such as alkyl-α or ω-diyl, o is from ≥1 to ≤100, preferably from ≥5 to ≤30 and more preferably from ≥10 to ≤20 and p is ≤2. The group X can by way of example be —$CH_2$—$CH_2$—$CH_2$—. A preferred surfactant is 3-(polyoxyethylene)propylheptamethyltrisiloxane. This is obtainable commercially from Dow Corning with the trademark Q2-5211®.

In another embodiment of the process of the invention, the HLB value of surfactant component B) is from ≥10 to ≤18. This index can also be in the range from ≥11 to ≤16 or in the range from ≥12 to ≤14. The HLB value (hydrophilic-lipophilic-balance value) describes the hydrophilic and lipophilic content of primarily non-ionic surfactants. The HLB value for non-ionic surfactants can be calculated as follows: HLB=20·(1−$M_h$/M), where $M_h$ is the molar mass of the hydrophobic fraction of a molecule and M is the molar mass of the entire molecule.

In another embodiment of the process of the invention, surfactant component B) is present in a form covalently bonded to a compound reactive towards isocyanates or to a polyisocyanate. The linkage preferably takes place by way of a free OH group of the surfactant. In the case of a polyester polyol, covalent linkage to a polyol can by way of example take place through an esterification reaction with an acid end group of the polyol. Linkage to a polyisocyanate takes place through reaction of an NCO group with a free OH group of the surfactant. Covalent linkage of the surfactant to a component of the polyurethane matrix immobilizes the surfactant and thus allows inhibition of migration out of the resultant polyurethane foam.

In another embodiment of the process of the invention, polyisocyanate component D) is monomeric and/or polymeric diphenylmethane 4,4'-diisocyanate. This type of polyisocyanate is obtainable with the trademark Desmodur® 44V70L in the form of a mixture of diphenylmethane 4,4'-diisocyanate (MDI) with isomers and with higher-functionality homologues, from Bayer MaterialScience AG.

In another embodiment of the process of the invention, the relative proportion by weight γ of surfactant component B) in the mixture comprising components A), B) and C) is from ≥0.05 to ≤0.3, based on the entire composition. The said mixture can also comprise other, conventional auxiliaries and other, conventional additives. The expression "mixture comprising A), B) and C)" means the ready-to-use formulation prior to addition of the polyisocyanate. It is moreover preferable that the temperature of the mixture is from ≥20° C. to ≤80° C. Under these conditions, microemulsions of the blowing agent in the polyol phase are likely to be obtained with minimum surfactant use. The γ value can also be from ≥0.10 to ≤0.26 or else from ≥0.15 to ≤0.20. The temperature can be from ≥20° C. to ≤80° C.

In another embodiment of the process of the invention, the amounts present of components A), B), C), and D) are as follows:
A) from ≥25% by weight to ≤30% by weight
B) from ≥4% by weight to ≤15% by weight
C) from ≥5% by weight to ≤40% by weight
D) from ≥30% by weight to ≤60% by weight.

The % by weight data here give a total of ≤100% by weight. Preferred amounts of the components are:
A) from ≥27% by weight to ≤29% by weight
B) from ≥8% by weight to ≤12% by weight
C) from ≥8% by weight to ≤20% by weight
D) from ≥40% by weight to ≤50% by weight.

In another embodiment of the process of the invention, the closed mould into which the mixture comprising components A), B), C) and D) is introduced comprises, in order to accommodate the mixture, an interior volume restricted by a movable seal, and the position of the movable seal can be altered by mechanical pressure and/or by fluid pressure. This method provides the external influence on the volume and on the pressure in the interior of the mould. This embodiment is explained further by way of example in conjunction with FIGS. 1 and 3.

The present invention further provides a polyurethane foam which is obtainable through a process of the invention. For details of the process, reference is made to the description above. The apparent density of the foam of the invention in accordance with DIN EN 1602 can be way of example be from ≥10 kg/m³ to ≤300 kg/m³ and preferably from ≥20 kg/m³ to ≤100 kg/m³. Preferred uses for the foam of the invention are found in thermal insulation.

Although the foam of the invention has low density it does not take the form of an aerogel. Aerogels, as described by way of example in WO 2006/128872 A1 and in the publications cited therein, are obtained by removing a fluid in the supercritical state from the gel during the drying step. However, the result here is not a foam. Spherical particulate structures are obtained.

In one embodiment of the polyurethane foam of the invention, this takes the form of foam with an average pore diameter of from ≥10 nm to ≤10 000 nm. The pore diameter can also be from ≥20 nm to ≤1000 nm and from ≥40 nm to ≤800 nm. The pore diameter is preferably determined by means of electron microscopy and measurement of the pores. Alternative methods are determination by mercury intrusion (DIN 66133) and nitrogen sorption (DIN 66134).

In another embodiment of the polyurethane foam of the invention, this has a pore density of from ≥$10^7$ pores/cm³ to ≤$10^{18}$ pores/cm³. The pore density is determined by means of electron microscopy. The number of pores per unit area is determined on a representative cross-sectional area of the foam here, and this is used as a basis for the volume-related calculation. The pore density can also be in the range from ≥$10^9$ pores/cm³ to ≤$10^{16}$ pores/cm³ and preferably from ≥$10^{12}$ pores/cm³ to ≤$10^{14}$ pores/cm³.

In another embodiment of the polyurethane foam of the invention, the thermal conductivity of the foam is from ≥6 mW/m K to ≤30 mW/m K. This conductivity can be determined by means of DIN 52616 and can also be in the range from ≥8 mW/m K to ≤25 mW/m K and preferably from ≥10 mW/m K to ≤20 mW/m K. It is preferable that the said foam is a foam blown entirely with $CO_2$. In other words, the blowing agent component used to produce the said foam is exclusively $CO_2$.

Figure 2:
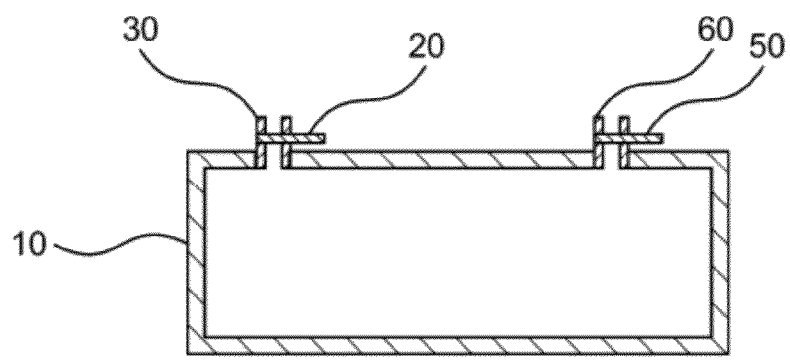
FIG. 2 illustrates a closed mould that can be used according to an embodiment of the present the invention.
Figure 3:
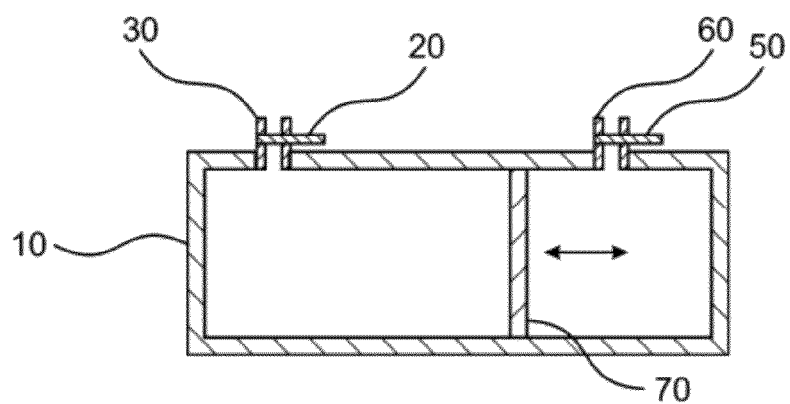
FIG. 3 illustrates a closed mould that can be used according to an embodiment of the present the invention.

The examples below, in conjunction with the figures, provide further explanation of the present invention:

FIGS. 1 to 3 show closed moulds that can be used according to the invention

Figure 4:
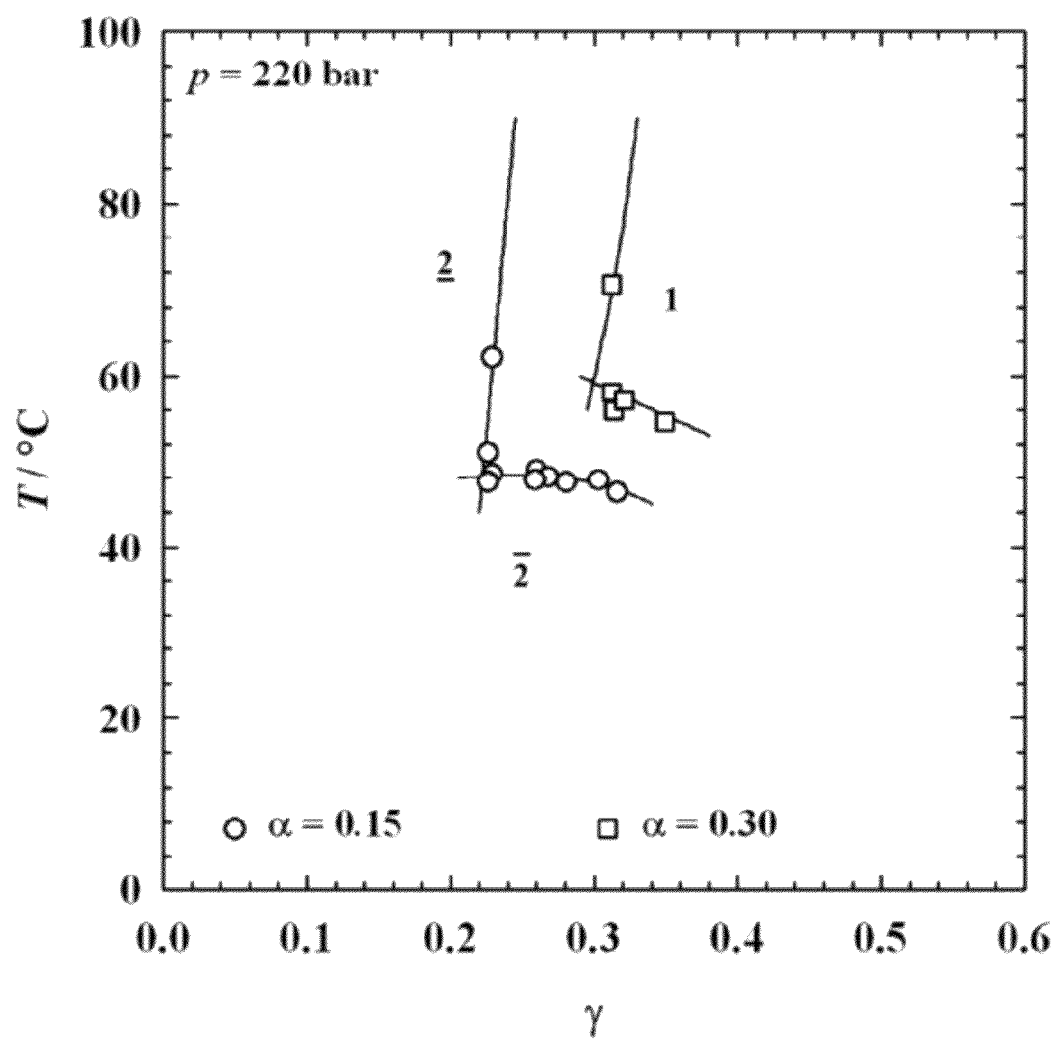
FIG. 4 illustrates a graph of the temperature T plotted against the surfactant content γ for the system characterized in Example 1.

FIG. 4 shows a graph of the temperature T plotted against the surfactant content γ for the system characterized in Example 1

Figure 5:
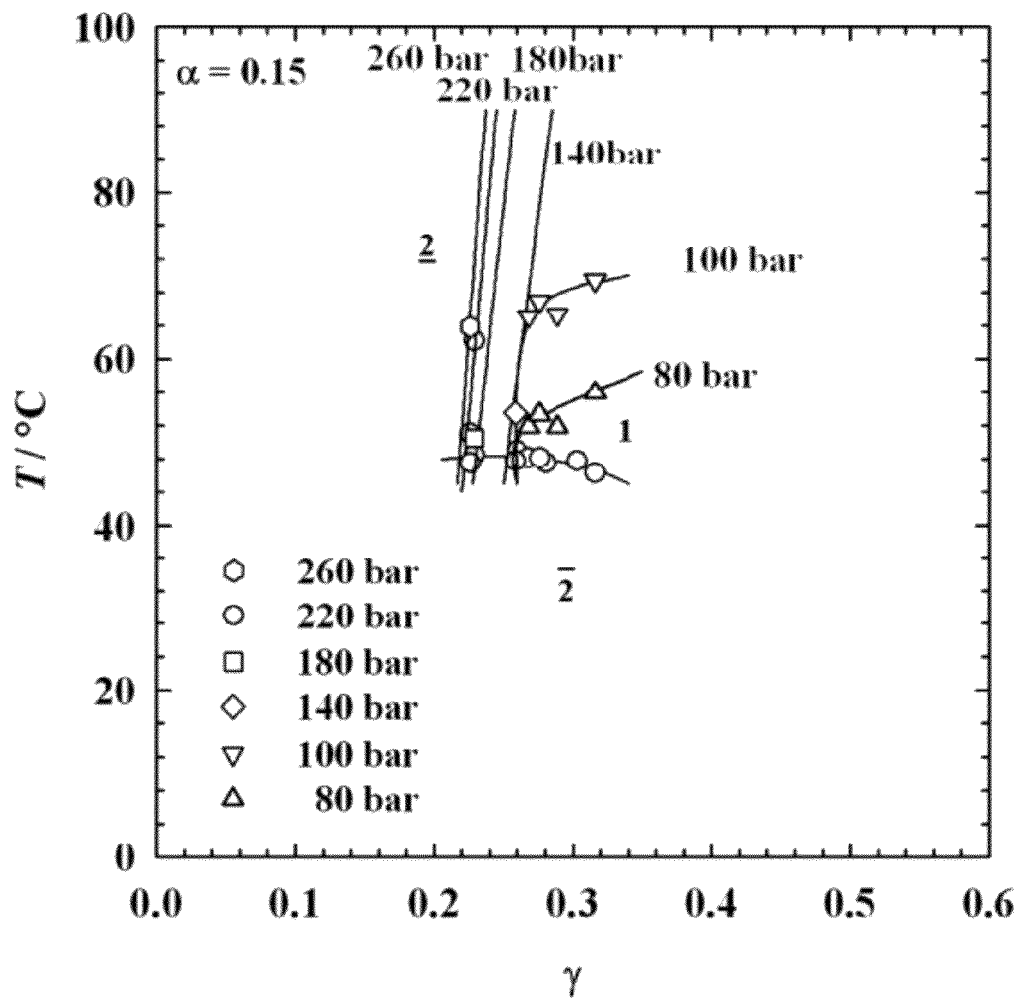
FIG. 5 illustrates a graph of the temperature T plotted against the surfactant content γ for the system characterized in Example 2.

FIG. 5 shows a graph of the temperature T plotted against the surfactant content γ for the system characterized in Example 2

Figure 6:
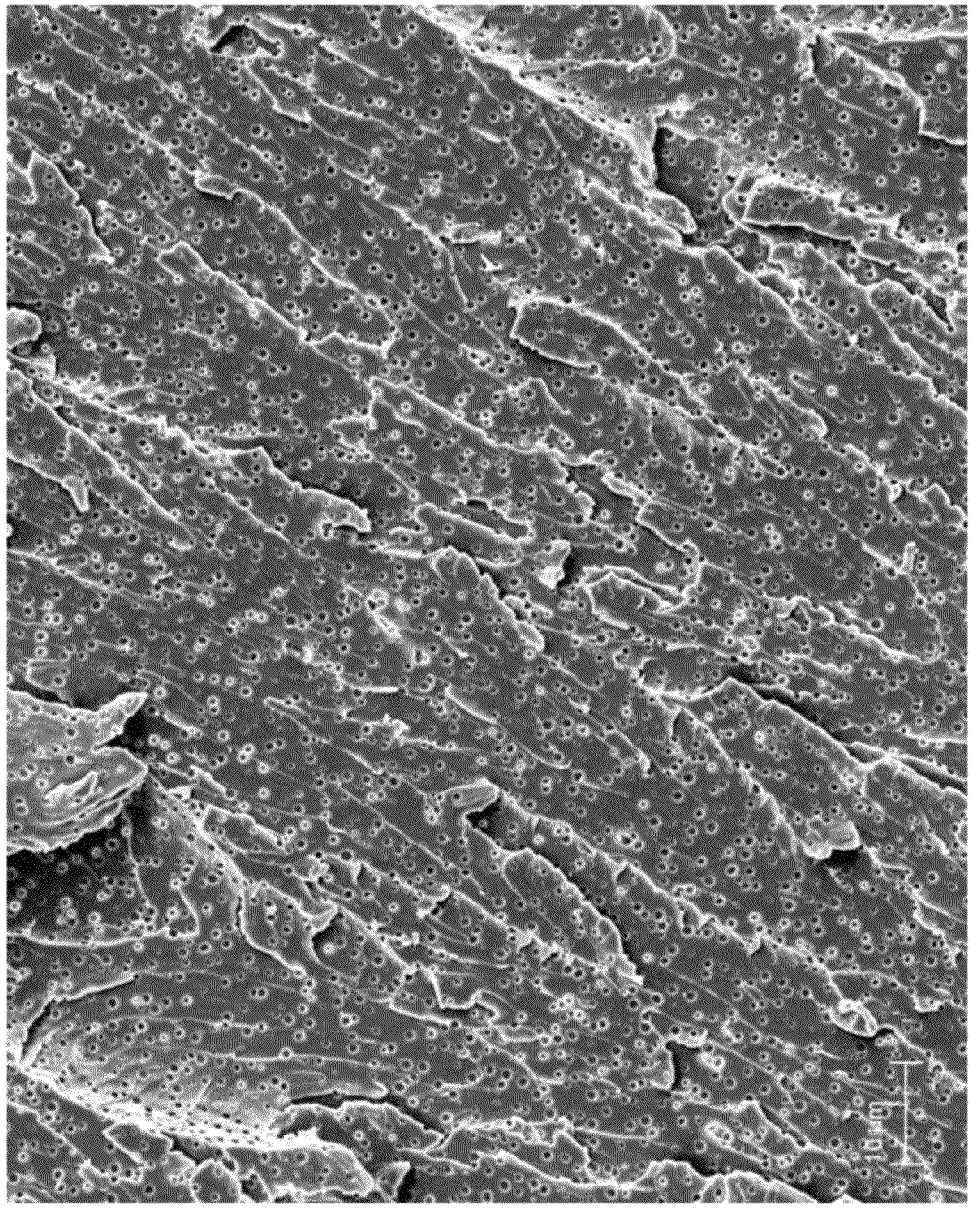
FIG. 6 illustrates a scanning electron micrograph of the foam obtained in Example 3.
Figure 7:
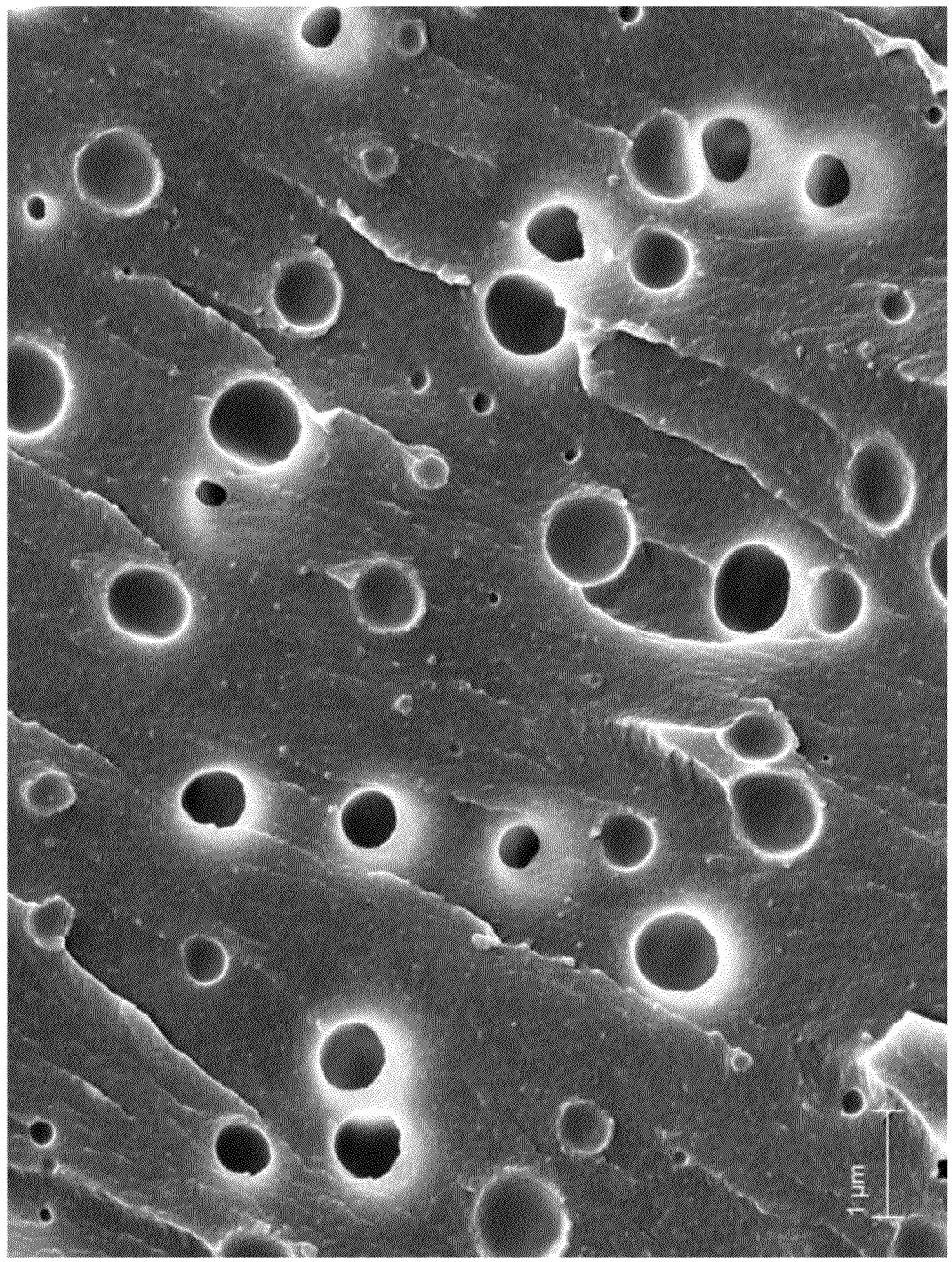
FIG. 7 illustrates a scanning electron micrograph of the foam obtained in Example 3.

FIGS. 6 and 7 show scanning electron micrographs of the foam obtained in Example 3

Figure 8:
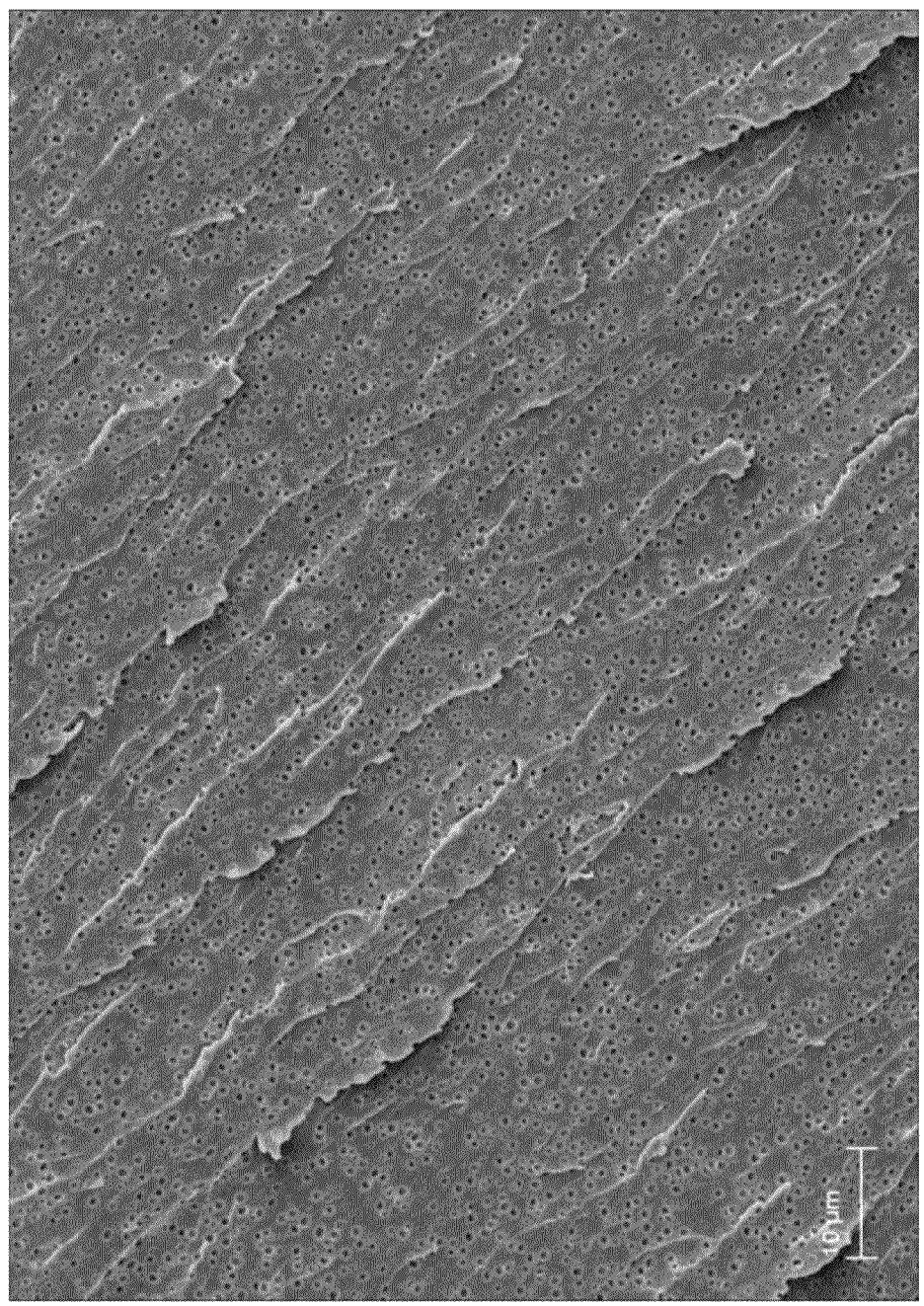
FIG. 8 illustrates a scanning electron micrograph of the foam obtained in Example 4.
Figure 9:
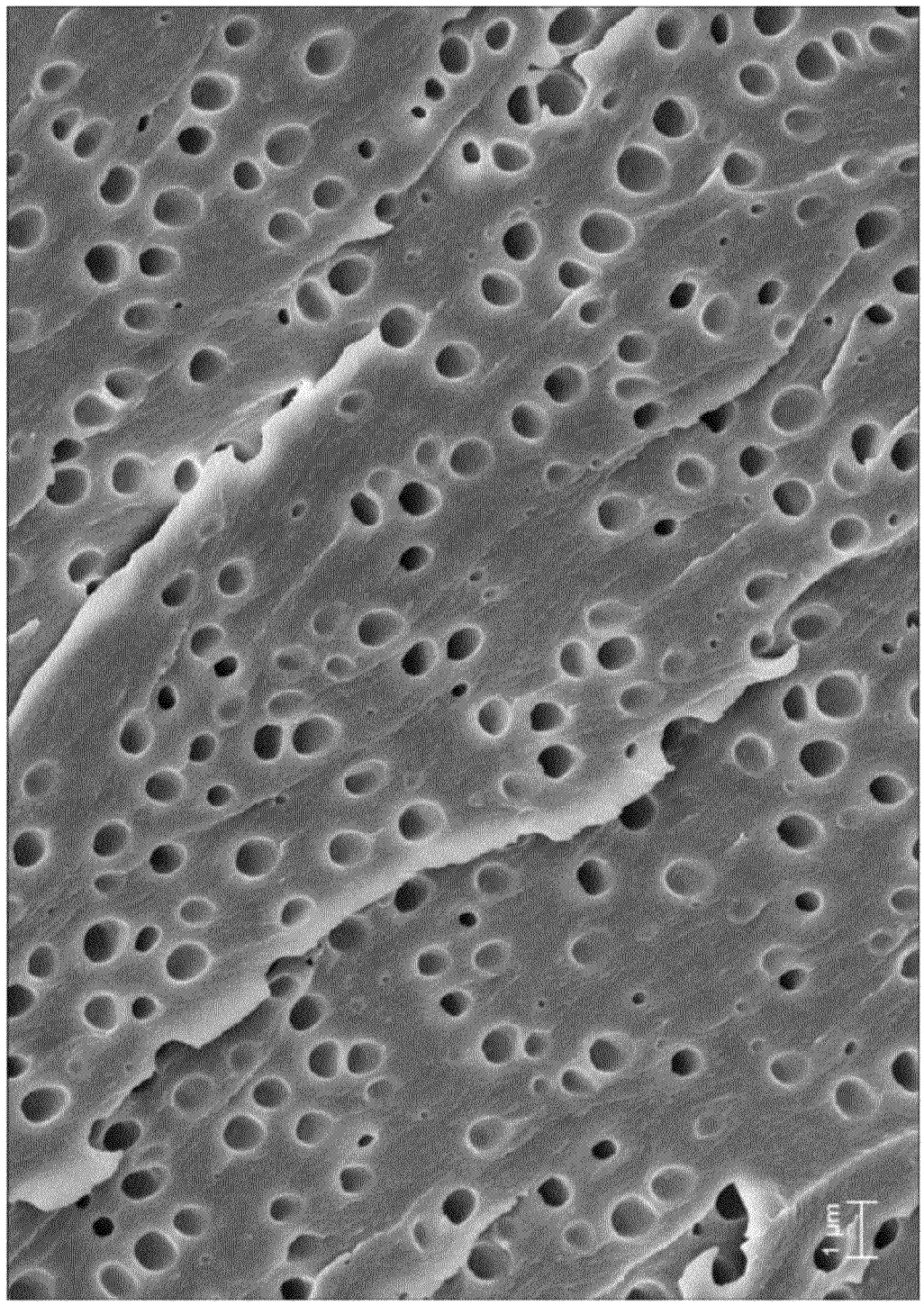
FIG. 9 illustrates a scanning electron micrograph of the foam obtained in Example 4.

FIGS. 8 and 9 show scanning electron micrographs of the foam obtained in Example 4

FIG. 1 shows a closed mould that can be used according to the invention. The mould has an exterior casing 10 with an inlet aperture 30 shown diagrammatically, which can be sealed by shut-off device 20. The mixture comprising the reaction components required is introduced into the mould by way of the said aperture. A piston-like seal 40 is movable within the casing 10. A volume restricted by the seal 40 is thus created within the mould to accommodate the reaction mixture. The position of the seal 40 within the casing can be achieved by displacement by means of the rod-like continuation which is part of the seal 40 and which protrudes out of the casing 10, i.e. by mechanical pressure.

FIG. 2 shows another closed mould that can be used according to the invention. The mould likewise has an exterior casing 10 with an inlet aperture 30 shown diagrammatically, which can be sealed by shut-off device 20. The mixture comprising the reaction components required is introduced into the mould by way of the said aperture. The external influence on the pressure in the mould is achieved by applying a gas pressure by way of another valve device 60. This has been shown diagrammatically, and can be sealed when necessary by means of shut-off device 50. It is also conceivable for the purposes of the present invention that the inlet aperture 30 and the valve device 60 are combined with one another. By way of example, it is then possible that a mixing head attached to the inlet aperture 30 also simultaneously applies gas pressure to the mould.

FIG. 3 shows another closed mould that can be used according to the invention. The mould likewise has an exterior casing 10 with an inlet aperture 30 shown diagrammatically, which can be sealed by shut-off device 20. The mixture comprising the reaction components required is introduced into the mould by way of the said aperture. Within the casing 10, there is a seal 70, which is freely movable or else is free-floating. A volume (reaction volume) restricted by the seal 40 is thus created within the mould to accommodate the reaction mixture. Another volume is obtained on the other side of the seal 70 within the mould 10, and this volume will be termed operating volume here. Unlike in the mould shown in FIG. 1, the position of the seal is not altered by mechanical pressure, but instead by gas pressure. The pressure is applied within the operating volume by way of a valve device 60, which can be sealed when necessary by shut-off device 50. The operating volume can thus be enlarged or diminished relative to the reaction volume. This is attended by an increase or reduction of the pressure in the reaction volume. It is, of course, possible not only to introduce gases by means of valve device 60 into the operating volume but also to introduce other fluids, for example hydraulic liquids.

The value $\alpha$ in the examples and figures gives the relative proportion by weight of the blowing agent, i.e. of the non-polar phase, in the polyol/blowing agent mixture. The value $\Psi$ denotes the mass fractions of the individual components in the polar phase. The value $\gamma$ denotes the relative proportion by weight of the surfactant component, based on the entire composition. The reference sign 1 in the figures indicates a single-phase sector in which microemulsions occur, 2 indicates a two-phase sector where the surfactant has dissolved in the polar phase, and $\overline{2}$ indicates a two-phase sector in which the surfactant has dissolved in the non-polar phase.

The individual examples respectively relate to particular polyol/blowing agent/surfactant systems. Within the examples, various formulations have been characterized in more detail with different proportion $\alpha$ of the blowing agent. For each constant proportion $\alpha$, the proportion $\gamma$ of surfactant component was altered. The constitution of the surfactant component itself was kept constant in all of the examples. The temperature of the system was recorded, and connecting lines were interpolated between the measurement points, in order to determine the boundaries between the single-, two- and three-phase sectors. This method gave a diagram which is comparable with a Kahlweit-Fisch diagram (M. Kahlweit, R. Strey, Angewandte Chemie International Edition, Volume 28(8), page 654 (1985)). The point of intersection of the connecting lines is of particular interest for the characterization of the system. Once the position of the intersection point in the coordinates system of $\gamma$ and T is known, a microemulsion can be expected to occur at a slightly greater proportion $\gamma$ of surfactant.

The substance names used in the examples have the following meanings:

Desmophen® VP.PU 1431: difunctional polyester polyol from Bayer MaterialScience AG, OH number 310 mg KOH/g TCPP: tris(2-chloroisopropyl)phosphate Q2-5211®: siloxylated polyethylene oxide polyether from Dow Corning, 3-(polyoxyethylene)propylheptamethyltrisiloxane, end groups: OH and heptamethyltrisiloxane, 32% of siloxane groups, 68% of ethylene oxide units; HLB value of EO content: 11.5

Desmorapid® 726b: catalyst from Bayer MaterialScience AG

DBTL: dibutyltin dilaurate

Desmodur® 44V70L: mixture of diphenylmethane 4,4'-diisocyanate (MDI) with isomers and higher-functionality homologues from Bayer MaterialScience AG Desmodur® 85/25: mixture of diphenylmethane 4,4'-diisocyanate (MDI) with isomers and higher-functionality homologues from Bayer MaterialScience AG Example 1

In this example, Q2-5211® was used for the surfactant component. Supercritical $CO_2$ (sc$CO_2$) was used as blowing agent. The polyol component was a mixture of 80 parts by weight of Desmophen® VP.PU 1431, 15 parts by weight of glycerol and 15 parts by weight of TCPP. This corresponds to mass fractions of $\Psi_{VP.PU\ 1431}=0.728$, $\Psi_{glycerol}=0.136$ and $\Psi_{TCPP}=0.136$. Formulations were mixed with ==0.15 and $\alpha=0.30$. The pressure in this example was 220 bar. FIG. 4 gives the results. The parameters determined at the point of intersection of the connecting lines in the phase diagram were as follows:

| $\alpha$ value | $\gamma$ value | Temperature at point of intersection |
|---|---|---|
| 0.15 | 0.22 | 48° C. |
| 0.30 | 0.29 | 58° C. |

Example 2

The system used here was the same as in Example 1, i.e. Q2-5211®, supercritical $CO_2$ and, as polyol component, a mixture of 80 parts by weight of Desmophen® VP.PU 1431, 15 parts by weight of glycerol and 15 parts by weight of TCPP. This again corresponds to mass fractions of $\Psi_{VP.PU\ 1431}=0.728$, $\Psi_{glycerol}=0.136$ and $\Psi_{TCPP}=0.136$. The pressure was varied, with an $\alpha$ value of 0.15. FIG. 5 gives the results. From this example it is possible to conclude that the position of the microemulsion region can be adjusted appropriately through alteration of the pressure. The parameters determined at the point of intersection of the connecting lines in the phase diagram were as follows:

| Pressure | γ value | Temperature at point of intersection |
| --- | --- | --- |
| 260 bar | 0.22 | 48° C. |
| 220 bar | 0.23 | 48° C. |
| 180 bar | 0.23 | 48° C. |
| 140 bar | 0.25 | 48° C. |
| 100 bar | 0.25 | 48° C. |
| 80 bar | 0.26 | 48° C. |

Example 3

A microemulsion obtainable in accordance with the teaching of Examples 1 and 2 was reacted to give a polyurethane foam. $CO_2$ was admixed here with the mixture of polyols, TCPP and surfactant at 58° C. and at a pressure of 170 bar. Without restriction to any theory, it is assumed that a microemulsion of $scCO_2$ droplets in the polyol phase formed here. The polyisocyanate was admixed with the said emulsion in a high-pressure mixing head. The reaction mixture was then introduced into a mould with a counterpressure of 80 bar. Supercritical conditions therefore continued to prevail in the mould in relation to the $CO_2$. The pressure was reduced to atmospheric pressure only after the materials had been introduced into the mould, the temperature of which was controlled to 60° C., and after provision of a certain residence time.

The formulation was as follows:

| Component | OH number | Parts by weight | % by weight |
| --- | --- | --- | --- |
| Desmophen ® VP.PU 1431 | 310 mg KOH/g | 80 | 23.49% |
| Glycerol | 1827 mg KOH/g | 15 | 4.41% |
| TCPP | 0 | 15 | 4.41% |
| Q2-5211 ® | not determined | 45 | 13.22% |
| Desmorapid ® 726b | 0 | 0.30 | 0.09% |
| $CO_2$ | 0 | 24.69 | 7.25% |
| Desmodur ® 44V70L (NCO content 30.9% by weight) | | 160.53 | 47.14% |

Reaction Parameters:

Isocyanate temperature: 58° C.

Polyol temperature: 58° C.

Mixing time: 2 seconds

Counterpressure: 80 bar

Demoulding time: 10 minutes

Depressurization: after 10 minutes

γ value: 0.13

α value: 0.08

The α and γ values have been calculated inclusive of the isocyanate. The total shot weight was 120 grams. The resultant foam was studied by means of scanning electron microscopy. FIGS. 6 and 7 show scanning electron micrographs at different scales. Pores of diameter markedly less than 1 μm are seen to have formed in the resultant foam. The average pore radius was 240±79 nm. The average numeric density of the pores was $2.2 \cdot 10^{11}$. Without adopting any theory, it is assumed that the cells in the foam have become larger than in the original microemulsion as a result of Ostwald ripening during the polymerization process.

Example 4

| Component | OH number | Parts by weight | % by weight |
| --- | --- | --- | --- |
| Desmophen ® VP.PU 1431 | 310 mg KOH/g | 80 | 26.31% |
| Glycerol | 1827 mg KOH/g | 15 | 4.93% |
| TCPP | 0 | 15 | 4.93% |
| Q2-5211 ® | not determined | 45 | 14.80% |
| Desmorapid ® 726b | 0 | 0.30 | 0.10% |
| DBTL | 0 | 0.06 | 0.02 |
| $CO_2$ | 0 | 22.04 | 7.25% |
| Desmodur ® 85/25 (NCO content 32.6% by weight) | | 126.64 | 41.65% |

Reaction Parameters:

Isocyanate temperature: 34° C.

Polyol temperature: 33° C.

Mixing time: 2 seconds

Counterpressure: 100 bar

Demoulding time: 10 minutes

Depressurization: after 10 minutes

γ value: 0.15

α value: 0.09

The α and γ values have been calculated inclusive of the isocyanate. The total shot weight was 120 grams. The resultant foam was studied by means of scanning electron microscopy. FIGS. 8 and 9 show scanning electron micrographs at different scales. Pores of diameter markedly less than 1 μm are seen to have formed in the resultant foam. The average pore radius was 180±59 nm. The average numeric density of the pores was $3.6 \cdot 10^{11}$. Without adopting any theory, it is assumed that the cells in the foam have become larger than in the original microemulsion as a result of Ostwald ripening during the polymerization process.

The invention claimed is:

1. A process for producing a polyurethane foam, comprising the following steps:
   providing a mixture comprising:
   A) a component reactive towards isocyanates;
   B) a surfactant component;
   C) one or more blowing agent components selected from the group consisting of linear, branched or cyclic $C_1$- to $C_6$-alkanes; linear, branched or cyclic $C_1$- to $C_6$-fluoroalkanes; $N_2$; $O_2$; argon and $CO_2$, wherein the blowing agent component C) is present in the supercritical or near-critical state; and
   D) a polyisocyanate component;
   introducing the mixture comprising components A), B), C), and D) into a closed mould while maintaining the supercritical or near-critical state of blowing agent component C), wherein the closed mould has been set up in such a way that its interior volume and/or the pressure prevailing in its interior can be altered after introducing the mixture by external influence;
   providing a predetermined period of residence time of >0 seconds for the mixture comprising components A), B), C), and D) in the closed mould, wherein during the residence time of the mixture comprising components A), B), C) and D), blowing agent component C) is present in the supercritical or near-critical state; and
   enlarging the interior volume of the closed mould and/or reducing the pressure prevailing in the interior of the closed mould by external influence so that blowing agent component C) is no longer present in the supercritical or near-supercritical state.

2. The process according to claim 1, wherein the prevailing pressure after the mixing of components A), B), C), and D) is from ≥40 bar to ≤150 bar.

3. The process according to claim 1, wherein component A) comprises a polyester polyol with a hydroxy number from ≥200 mg KOH/g to ≤600 mg KOH/g and a short-chain polyol with a hydroxy number of ≥800 mg KOH/g.

4. The process according to claim 1, wherein the surfactant component B) comprises a polyethylene oxide-polyether having oligodimethylsiloxane end groups, wherein the number of the dimethylsiloxane units is ≤5.

5. The process according to claim 1, wherein the HLB value of the surfactant component is from ≥10 to ≤18.

6. The process according to claim 1, wherein the surfactant component B) is present in a form covalently bonded to a compound reactive towards isocyanates or to a polyisocyanate.

7. The process according to claim 1, wherein the polyisocyanate component D) comprises monomeric and/or polymeric diphenylmethane 4,4'-diisocyanate.

8. The process according to claim 1, wherein the relative proportion by weight γ of the surfactant component B) in the mixture comprising components A), B) and C) is from ≥0.05 to ≤0.3, based on the entire composition.

9. The process according to claim 1, wherein the amounts present of components A), B), C), and D) are as follows:
A) from ≥25% by weight to ≤30% by weight
B) from ≥4% by weight to ≤15% by weight
C) from ≥5% by weight to ≤40% by weight
D) from ≥30% by weight to ≤60% by weight.

10. The process according to claim 1, wherein the closed mould into which the mixture comprising components A), B), C) and D) is introduced comprises, in order to accommodate the mixture, an interior volume restricted by a movable seal, and wherein the position of the movable seal can be altered by mechanical pressure and/or by fluid pressure.

11. A polyurethane foam obtained by the process according to claim 1.

12. The polyurethane foam according to claim 11, present in the form of foam with an average pore diameter of from ≥10 nm to ≤10 000 nm.

13. The polyurethane foam according to claim 11 with a pore density of from ≥$10^7$ pores/cm$^3$ to ≤$10^{18}$ pores/cm$^3$.

14. The polyurethane foam according to claim 11 with a thermal conductivity of from ≥6 mW/m K to ≤30 mW/m K.

* * * * *